Jan. 8, 1946. T. J. HOLLENKAMP 2,392,383
TRACK FOR TRACK-LAYING VEHICLES
Filed March 20, 1943

INVENTOR
THEODORE J. HOLLENKAMP
BY
C. E. Herrstrom & H. E. Thibodeau
ATTORNEYS

Patented Jan. 8, 1946

2,392,383

UNITED STATES PATENT OFFICE 2,392,383

TRACK FOR TRACK-LAYING VEHICLES

Theodore J. Hollenkamp, Detroit, Mich.

Application March 20, 1943, Serial No. 479,834

2 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to a novel track for track-laying vehicles such as, for example, combat tanks, and also to the block or link as an element of such a track.

It has been customary to equip the track with heavy rubber treads, and the metal portion or skeleton of the track was designed accordingly. With the shortage of rubber, it became necessary to eliminate the treads and to provide a substantially all-metal track but the new designs were merely adaptations or modifications of the original rubber-carrying shapes.

The object of this invention is to provide an all-metal track designed independently of the rubber tread types and incorporating the best known characteristics of track design. Such a track is desirable, independently of the rubber scarcity, from the standpoint of durability, simplicity and economy in manufacture.

One of the desirable properties is increased track width to provide optimum ground pressure without unduly increasing the weight. In fact the weight for a given length and width is decreased.

Another desirable property incorporated in the invention is a provision for driving the track through the block or link rather than through the hinge pin connecting the blocks. This result is accomplished by forming the driving lug as an integral part of the body of the block. Also, as an integral part of the block there is formed a center guide adapted to move between two coaxial bogie wheels. The various parts extending from the body of the blocks as integral portions thereof are so designed that the block with its appurtenances can readily be formed by molding.

In the assembled track, the invention contemplates a continuous rather than a divided hinge in joining adjacent blocks. The joint elements are apertured fingers extending from one block into slots formed in a boss in the next block. The pin fits rather snugly in the fingers and consequently follows the relative displacement of the fingers lengthwise of the track, or in a direction radial of the pin. This movement of the pin is absorbed in surrounding resilient bushings which line the sections of the boss.

The invention is fully disclosed by way of example in the following description and in the accompanying drawing in which.

Reference to these views will now be made by use of like characters which are employed to designate corresponding parts throughout.

Figure 1:
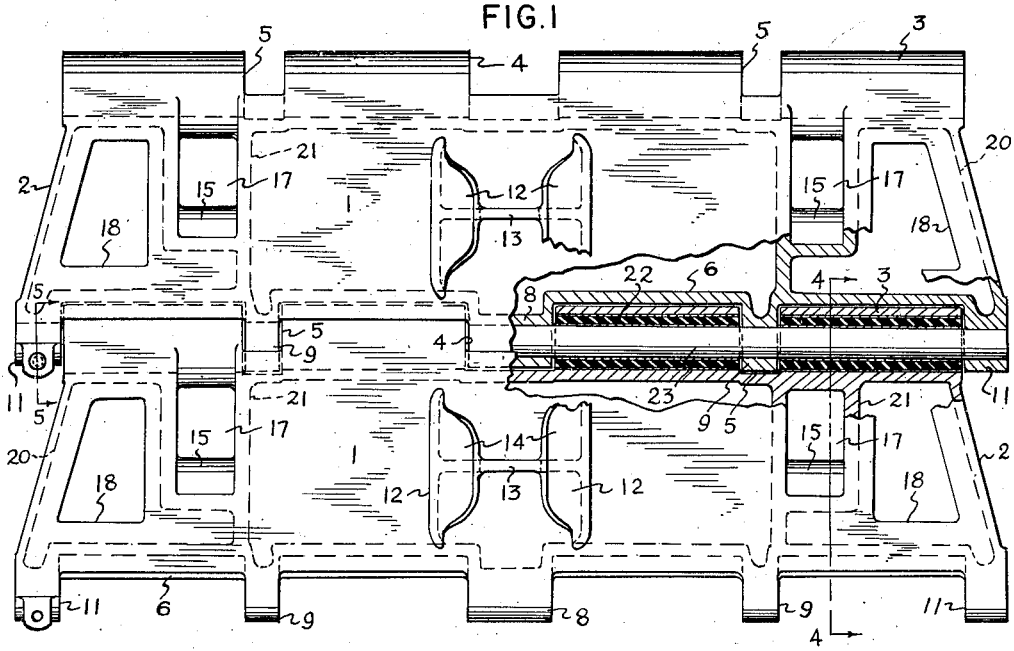
Figure 1 is a plan view, partly in section, of a pair of joined blocks.

The track is carried and laid by the vehicle, for example, a combat tank and consists of an endless chain of blocks corresponding to links. Each block is a four-sided steel member of elongated configuration having a plane body portion 1 and its shorter sides or ends converging toward each other as indicated at 2. Along one of the longer edges is formed a boss or housing 3 lying at one side of the plane of the member 1. For convenience this side will be designated as the outer side. The boss is interrupted or formed with a transverse opening 4 midway between its ends, and each of the sections thus formed is again divided substantially into halves by narrower slots 5.

Along the opposite longitudinal edge of the body portion 1, and at the outer side thereof, is formed a curved flange 6 in complementary relation to the boss 3 and terminating in a grouser 7. Along the same edge and at intervals corresponding to the spacing of the slots 4, 5 are formed a wide finger 8 and narrower fingers 9 projecting in parallel relation to the plane of the portion 1. The fingers are respectively receivable in the slots 4 and 5 of an adjacent block and are apertured at 10 to register but not coincide with the interior surface of the boss in which they are inserted. At the end of the same edge are formed similar additional fingers 11 adapted to engage the ends of the adjacent block as shown in Figure 1. Another grouser 7' extends from the boss 3, of which it is an integral part. This grouser is interrupted at the slots 4 and 5 shown in Figure 1.

Figure 2:
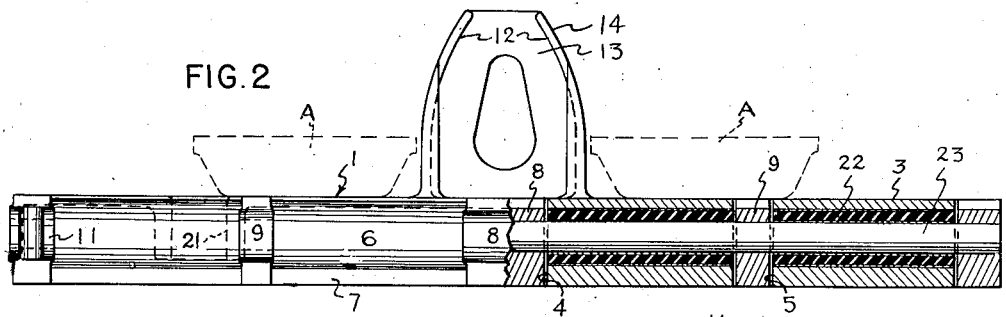
Figure 2 is a side elevation on one of the blocks, partly in section.

In the center of the block and on the inner surface thereof is formed a guide comprising, in this case, a pair of spaced transverse cheeks 12 joined by a web 13. These parts as well as other parts already mentioned and presently to be described are preferably formed integrally with the body portion 1. The free ends of the cheeks preferably converge toward each other at 14, while the entire guide lies between two bogie wheels A engaging the inner surface of the track as shown in Figure 2.

Figures 3, 4, 5:
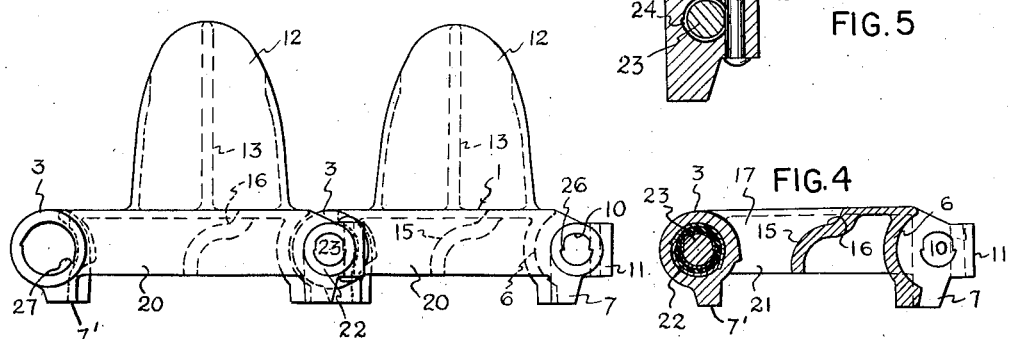
Figure 3 is an end view corresponding to Figure 1.
Figure 4 is a section on the line 4—4 of Figure 1.
Figure 5 is a section on the line 5—5 of Figure 1.

Near each end of the block, a lug 15 extends outwardly from the inner surface of the track through the body portion 1. The lug is curved as shown in Figure 4, and the convex side 16 thereof is engaged by correspondingly shaped teeth on a sprocket wheel, whereby the track is driven. Between each lug and the boss 3, the body portion 1 is relieved at 17 to admit the driving sprocket wheel, and similarly the ends of the body member may be relieved at 18 to reduce weight.

Along each end of the body portion 1 is formed a flange 20 extending outwardly coextensively with the lug 15 and merging into the boss 3 and the plate 6. From the boss 3 the flange is continued as a reinforcing rib 21 around the edges of the openings 17.

Each section of the boss 3 is lined with a rubber or similar resilient bushing 22 which, with the corresponding boss section, is received between consecutive fingers of the adjacent block, as shown in Figure 1. A single hinge pin 23 is then passed through the alined bushings and fingers, fitting closely in the latter. The pin is formed with a peripheral groove 24 at one or more of the fingers, and a locking pin 25 is passed through the finger to lie in the groove and is headed at both ends.

Each pin 23 and the inner wall of each boss 3 are nicked longitudinally and oppositely at 26 and 27 respectively to prevent rotation of the intervening bushing 22 relatively to these parts. Relative movement of adjacent blocks sets up a torsion in the bushing. In fact the blocks are assembled at a 15° angle to set up torsion in the straight parts of the track. As the blocks change their direction at the sprocket wheels, their momentum tends to resist the change. The initial torsion opposes this tendency.

The close fit of the hinge pin 23 in the fingers causes the pin to be shifted laterally when the fingers are displaced laterally of the adjacent block or lengthwise of the track. This movement of the pin is absorbed entirely in the resilient bushings 22.

It is now evident that the block is of greatly simplified construction and requires a minimum of metal. Moreover, it is of such design that it lends itself to manufacture by molding, with reinforcements providing adequate strength notwithstanding the comparatively small weight. The application of the driving force to the block itself, at the lug, rather than on the driving pin as in previous constructions, is considered a highly desirable characteristic.

By reason of the improved design, a track of given length and 24 inches wide weighs about 5500 pounds, while a conventional steel track of the same length and 16 inches wide weighs about 8300 pounds.

Although a specific embodiment of the invention has been illustrated and described, it will be understood that various alterations in the details of construction may be made without departing from the scope of the invention as indicated by the appended claims.

What I claim is:

1. A track block comprising an elongated body having plane wheel-engaging surfaces, a boss formed along one of the longitudinal edges thereof and having spaced transverse slots, apertured fingers at the opposite edge of said body and in alinement with said slots, a guide projecting from the inner side of said body and disposed between said surfaces, driving lugs projecting outwardly from said surfaces and at each side of said guide, said surfaces having an opening adjacent to each lug for entrance of a sprocket wheel to engage the lug.

2. A track block comprising an elongated body having plane wheel-engaging surfaces, a boss formed along one of the longitudinal edges thereof and having spaced transverse slots, apertured fingers at the opposite edge of said body and in alinement with said slots, a guide projecting inwardly from the inner side of said body and disposed between said surfaces, said guide having two opposed cheeks respectively facing said surfaces, driving lugs projecting outwardly from said surfaces at each side of said guide, said surfaces having an opening adjacent to each lug for entrance of a sprocket wheel to engage the lug.

THEODORE J. HOLLENKAMP.